US012507282B2

United States Patent
Lin (10) Patent No.: US 12,507,282 B2
(45) Date of Patent: Dec. 23, 2025

(54) USER EQUIPMENT AND METHOD FOR SHARING PERIODIC CHANNEL OCCUPANCY

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 455 days.

(21) Appl. No.: 18/085,670

(22) Filed: Dec. 21, 2022

(65) Prior Publication Data

US 2023/0125590 A1    Apr. 27, 2023

Related U.S. Application Data (63) Continuation of application No. PCT/IB2020/000858, filed on Aug. 7, 2020.

(51) Int. Cl.
  *H04W 74/0816*   (2024.01)
  *H04W 72/1268*   (2023.01)
  *H04W 74/08*     (2024.01)

(52) U.S. Cl.
  CPC ... *H04W 74/0816* (2013.01); *H04W 72/1268* (2013.01); *H04W 74/0866* (2013.01)

(58) Field of Classification Search
  CPC ......... H04W 74/0866; H04W 72/1268; H04W 74/0816
  See application file for complete search history.

(56) References Cited

U.S. PATENT DOCUMENTS

| | | | |
|---|---|---|---|
| 2017/0238311 A1* | 8/2017 | Hooli | H04W 72/23 370/329 |
| 2019/0342911 A1* | 11/2019 | Talarico | H04L 5/0098 |
| 2021/0084683 A1* | 3/2021 | Li | H04W 74/0808 |
| 2021/0235491 A1* | 7/2021 | Iyer | H04W 74/0808 |
| 2021/0368351 A1* | 11/2021 | Cui | H04W 74/002 |
| 2022/0272754 A1* | 8/2022 | Lei | H04W 74/0816 |

OTHER PUBLICATIONS

Huawei, HiSilicon, Coexistence and channel access for NR unlicensed band operations, R1-1901525, 3GPP TSG RAN WG1 Meeting #96, Athens, Greece, Feb. 25-Mar. 1, 2019.
OPPO, Channel access procedures for NR-U. R1-1901922, 3GPP TSG RAN WG1 #96, Athens, Greece, Feb. 25-Mar. 1, 2019.

(Continued)

*Primary Examiner* — James P Duffy
(74) *Attorney, Agent, or Firm* — Ladas & Parry LLP (57) ABSTRACT

Embodiments of the present application provide user equipment and a method of communication of the same. The method includes initiating a periodic channel occupancy with a first period and using a first information to indicate the initiated channel occupancy that is to be shared by a base station or a second UE. This can allow UE initiated channel occupancy and UE can share the initiated channel occupancy with the base station in a semi-static channel access mode, solve issues in the prior art, improve transmission latency, provide a good communication performance, and/or provide high reliability.

20 Claims, 5 Drawing Sheets

(56) References Cited

OTHER PUBLICATIONS

Vivo, Outcome of offline discussion on Configured grant enhancement, R1-1903476, 3GPP TSG RAN WG1#96, Athens, Greece, Feb. 25-Mar. 1, 2019.

OPPO, Discussion on the remaining issues of channel access procedure, R1-2004085, 3GPP TSG RAN WG1 #101-E May 2-Jun. 5, 2020.

Huawei, HiSilicon, DraftCR for COT sharing in configured grant, R2-2004991, 3GPP TSG-RAN WG2 Meeting #110-e, Electronic, Jun. 1-12, 2020.

3GPP TS 37.213 V16.0.0 (Dec. 2019) ; 3rd Generation Partnership Project;Technical Specification Group Radio Access Network;Physical layer procedures for shared spectrum channel access (Release 16).

International Search Report (ISR) dated Feb. 5, 2021 for Application No. PCT/IB2020/000858.

Written Opinion (WOSA) dated Feb. 5, 2021 for Application No. PCT/182020/000858.

The first Office Action of corresponding European application No. 20819856.4, dated Mar. 3, 2025.

* cited by examiner

USER EQUIPMENT AND METHOD FOR SHARING PERIODIC CHANNEL OCCUPANCY

CROSS-REFERENCE TO RELATED APPLICATIONS

This application is a continuation of International Application No. PCT/IB2020/000858, filed on Aug. 7, 2020, which is hereby incorporated by reference in its entirety.

TECHNICAL FIELD

The present disclosure relates to the field of communication systems, and more particularly, to a user equipment and a method of communication of the same, which can provide a good communication performance and/or provide high reliability.

BACKGROUND

In an unlicensed band, an unlicensed spectrum is a shared spectrum. Communication equipment in different communication systems can use the unlicensed spectrum as long as the unlicensed spectrum meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel. In other words, when the base station shares its own channel occupancy time with the UE, the UE can use an LBT mode with higher priority than that used by the UE itself to obtain the channel, thereby obtaining the channel with greater probability.

In the latest new radio unlicensed (NRU) system, if the NRU system is configured to be semi-static channel access mode, the UE cannot initiate a channel occupancy time (MCOT), and the UE has to detect a downlink signal before being allowed to transmit any uplink transmission. This will greatly limit a UE performance, and notably increasing transmission latency. To envision any latency stringent service, e.g. factory machine type communications or high quality surveillance, the latency needs to be reduced.

Therefore, there is a need for a user equipment and a method of communication of the same, which can allow UE initiated channel occupancy and UE can share the initiated channel occupancy with the base station in a semi-static channel access mode, solve issues in the prior art, improve transmission latency, provide a rood communication performance, and/or provide high reliability.

SUMMARY

An object of the present disclosure is to propose a user equipment and a method of communication of the same, which can allow UE initiated channel occupancy and UE can share the initiated channel occupancy with the base station in a semi-static channel access mode, solve issues in the prior art, improve transmission latency, provide a good communication performance, and/or provide high reliability.

In a first aspect of the present disclosure, a method of communication of a user equipment includes initiating a periodic channel occupancy with a first period and using a first information to indicate the initiated channel occupancy that is to be shared by a base station or a second UE.

In a second aspect of the present disclosure, a user equipment includes a memory, a transceiver, and a processor coupled to the memory and the transceiver. The processor is configured to initiate a periodic channel occupancy with a first period and use a first information to indicate the initiated channel occupancy that is to be shared by a base station or a second UE.

In a third aspect of the present disclosure, a non-transitory machine-readable storage medium has stored thereon instructions that, when executed by a computer, cause the computer to perform the above method.

In as fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF THE DRAWINGS

In order to illustrate the embodiments of the present disclosure Of related art more clearly, the following figures will be described in the embodiments are briefly introduced. It is obvious that the drawings are merely some embodiments of the present disclosure, a person having ordinary skill in this field can obtain other figures according to these figures without paying the premise.

DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
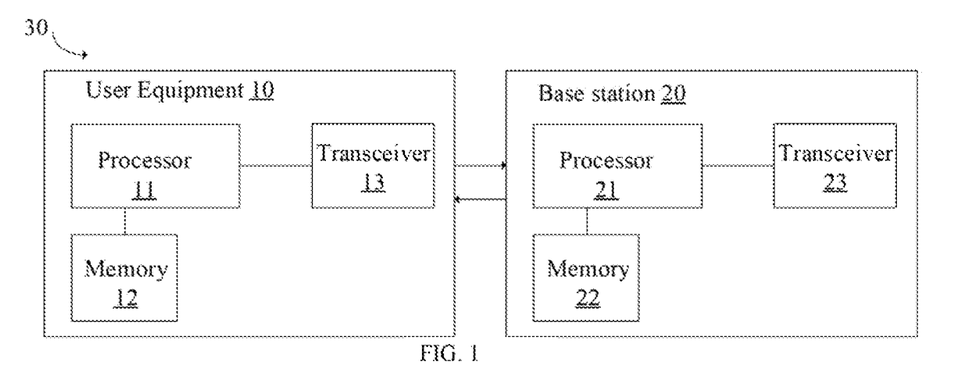
FIG. 1 is a block diagram of a user equipment and a base station of communication in a communication network system according to an embodiment of the present disclosure.

FIG. 1 illustrates that, in some embodiments, a user equipment (UE) 10 and a base station (BS) 20 of communication in a communication network system 30 according to an embodiment of the present disclosure are provided. The communication network system 30 includes the UE 10 and the base station 20. The UE 10 may include a memory 12, a transceiver 13, and a processor 11 coupled to the memory 12, the transceiver 13, The BS 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROW, random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond.

Some embodiments of the present disclosure are provided to allow UE initiated channel occupancy and the UE 10 can share the channel occupancy with the base station 20 (such as gNB) or a second UE in a semi-static channel access mode. In this disclosure, some embodiments present a method for the UE 10 to initiate a channel occupancy in a semi-static channel access mode and to share UE channel occupancy with the gNB.

In some embodiments, the processor 11 is configured to initiate a periodic channel occupancy with a first period and use a first information to indicate the initiated channel occupancy that is to be shared by the base station 20 or a second UE This can allow UE initiated channel occupancy and UE can share the initiated channel occupancy with the base station in a semi-static channel access mode, solve issues in the prior art, improve transmission latency, provide a good communication performance, and/or provide high reliability.

In some embodiments, the first period of the periodic channel occupancy is configured by the base station 20. In some embodiments, the periodic channel occupancy includes one or more fixed frame periods (FFPs). In some embodiments, initiating the periodic channel occupancy by the processor 11 includes performing a channel access procedure at the first period; or performing a channel access procedure at the beginning of each FFP. In some embodiments, the UE 10 is configured with one or more periodic configured grant (CG) resources by the base station 20 with a second period. In some embodiments, the second period is relevant to the first period. In some embodiments, a first CO resource of the one or more periodic CO resources is located at the beginning of the periodic channel occupancy, or is located at the beginning of an FFP. In some embodiments, the processor 11 performs a channel access procedure before transmitting a CG-physical uplink shared channel (PCSCH) in the first CG resource. In some embodiments, the UE 10 transmits the CG-PUSCH after the channel access procedure and the channel is sensed to be idle. In some embodiments, for each FFP, the FFP starts with the CG-PUSCH resource. In some embodiments, CG-PUSCH resources are in each FFP. In some embodiments, when the UE 10 successfully access a channel at the beginning of the FFP, the transceiver 13 continues transmitting the CG-PUSCH in the rest of the CP-PUSCH resources in the FFP. It is to note that in some embodiments of the present disclosure, one periodic channel occupancy and one FFP call be inter-changed.

In some embodiments, when the transceiver 13 transmits the CG-PUSCH, the transceiver 13 further transmits a CG-uplink control information (UCI), where the CG-UCI includes a first indication information indicating channel occupancy time (COT) sharing information to the base station 20 or to the second UE. In some embodiments, the indication information includes 1 bit, in which a dedicated value of the bit indicates that a UE channel occupancy is to be shared by the base station 20 or the second UE. In some embodiments, the UE 10 configured by the base station 20 with COT sharing information. In some embodiments, the COT sharing information includes a COT sharing energy detection threshold. In some embodiments, the processor 11 is configured to use the COT sharing energy detection threshold to perform the channel access procedure. In some embodiments, when the processor 11 uses the COT sharing energy detection threshold to perform the channel access procedure, the processor can indicate in the CG-UCI that the channel occupancy is to be shared by the base station 20 or by the second UE. In some embodiments, the processor 11 selects if the COT sharing energy detection threshold is used for performing the channel access procedure.

In some embodiments, when the processor 11 selects to use the COT sharing energy detection threshold, the processor can select to share the UE channel occupancy or not with the base station 20. In some embodiments, when the processor 11 does not use the COT sharing energy detection threshold for performing the channel access procedure, the processor cannot share the UE channel occupancy with the base station 20. In some embodiments, when the UE channel occupancy is to be shared by the base station or by the second UE, a first duration, in which the UE channel occupancy is shared, is determined.

In some embodiments, the FFP or the periodic channel occupancy includes a maximum channel occupancy and an idle period. In some embodiments, the first duration is determined by the maximum channel occupancy. In some embodiments, the UE periodic channel occupancy is semi-statically configured by the base station via a signaling. In some embodiments, the signaling includes radio resource control (RRC) signaling. In some embodiments, the UE maximum channel occupancy is pre-defined or pre-configured. In some embodiments, the UE maximum channel occupancy is proportional to the first period. In some embodiments, the UE maximum channel occupancy includes X % of the first period, where X is pre-defined or pre-configured, the rest of the FFP includes the idle period. In some embodiments, the transceiver 13 is not allowed to transmit signals in the idle period. In some embodiments, when the UE channel occupancy is to be shared by the base station 20, the base station 20 should not perform transmission in the idle period. In some embodiments, the first duration is indicated by the CG-UCI. In some embodiments, the first duration ends at the earliest between the end of the maximum channel occupancy and a duration indicated by the CG-UCI.

In some embodiments, if the UE maximum channel occupancy ends earlier than the duration indicated by the CG-UCI, the first duration ends at the end of the UE maximum channel occupancy. In some embodiments, if the UE maximum channel occupancy ends later than the duration indicated by the CG-UCI, the first duration ends at the duration indicated by the CG-UCI. In some embodiments, a starting location for the first duration is pre-defined or pre-configured. In some embodiments, the starting location for the first duration is relevant to the last CG resource in the periodic channel occupancy, in some embodiments, the starting location for the first duration is from an earliest slot boundary after the last CG resource in the periodic channel occupancy. In some embodiments, a starting location for the first duration is indicated by the CG-UCI. In some embodiments, the first duration is equal to the starting location for the COT sharing duration plus a pre-defined or pre-configured length. In some embodiments, the CG-UCI does not include information about channel access priority class (CAPC).

In some embodiments, a CAPC value is pre-defined or pre-configured. In some embodiments, a pre-defined or pre-configured CAPC value is assumed by the base station 20. In some embodiments, the processor 11 is configured to use the pre-defined or pre-configured CAPC value to perform channel access procedure. In some embodiments, the pre-defined or pre-configured CAPC value corresponds to the lowest priority value. In some embodiments, the starting location of the first duration includes a starting location of a periodic channel occupancy of the base station 20 or an FFP of the base station.

Figure 2:
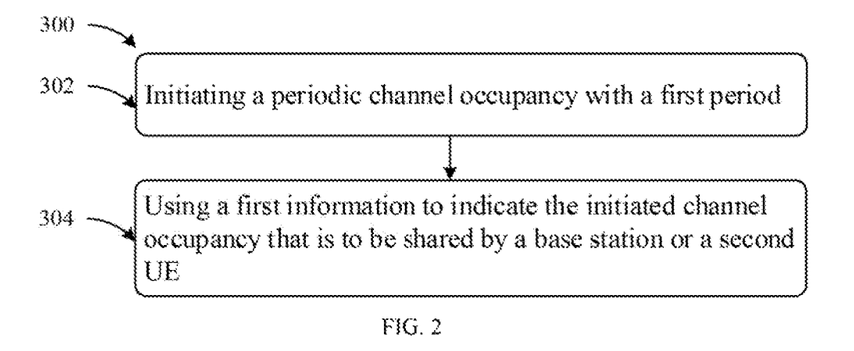
FIG. 2 is a flowchart illustrating a method of transmission of a user equipment according to an embodiment of the present disclosure.

FIG. 2 illustrates a method 300 of communication of a user equipment according to an embodiment of the present disclosure. In some embodiments, the method 300 includes: a block 302, initiating a periodic channel occupancy with a first period, and a block 304, using a first information to indicate the initiated channel occupancy that is to be shared by a base station or a second UE. This can allow UE initiated channel occupancy and UE can share the initiated channel occupancy with the base station in a semi-static channel access mode, solve issues in the prior art, improve transmission latency, provide a good communication performance, and/or provide high reliability.

In some embodiments, the first period of the periodic channel occupancy is configured by the base station. In some embodiments, the periodic channel occupancy includes one or more fixed frame periods (FFPs). In some embodiments, initiating the periodic channel occupancy by the UE includes performing a channel access procedure at the first period; or performing a channel access procedure at the beginning of each FFP. In some embodiments, the method further includes the UE being configured with one or more periodic configured grant (CG) resources by the base station with a second period. In some embodiments, the second period is relevant to the first period, in some embodiments, a first CO resource of the one or more periodic CG resources is located at the beginning of the periodic channel occupancy, or is located at the beginning of an FFP. In some embodiments, the UE performs a channel access procedure before transmitting a CG-physical uplink shared channel (PUSCH) in the first CG resource. In some embodiments, the UE transmits the CG-PUSCH after the channel access procedure and the channel is sensed to be idle. In some embodiments, for each FFP, the FFP starts with the CG-PUSCH resource. In some embodiments, CG-PUSCH resources are in each FFP.

In some embodiments, when the UE successfully access a channel at the beginning of the FFP, the UE continues transmitting the CG-PUSCH in the rest of the CP-PUSCH resources in the FFP. In some embodiments, the UE continues transmitting the CO-PUSCH in the rest of the CP-PUSCH resources in the FFP if the CG-PUSCH resources are contiguous. In some embodiments, when the UE transmits the CG-PUSCH, the UE further transmits a CG-uplink control information (UCI), where the CG-UCI includes a first indication information indicating channel occupancy time (COT) sharing information to the base station or to the second UE. In some embodiments, the indication information includes 1 bit, in which a dedicated value of the bit indicates that a UE channel occupancy is to be shared by the base station or the second UE. In some embodiments, the method further includes being configured by the base station with COT sharing information. In some embodiments, the COT sharing information includes a COT sharing energy detection threshold. In some embodiments, the method further includes using the COT sharing energy detection threshold to perform the channel access procedure. In some embodiments, when the UE uses the COT sharing energy detection threshold to perform the channel access procedure, the UE can indicate in the CG-UCI that the channel occupancy is to be shared by the base station or by the second UE. In some embodiments, the method further includes selecting if the COT sharing energy detection threshold is used for performing the channel access procedure. In some embodiments, when the UE selects to use the COT sharing energy detection threshold, the UE can select to share the UE channel occupancy or not with the base station. In some embodiments, when the UE does not use the COT sharing energy detection threshold for performing the channel access procedure, the UE cannot share the UE channel occupancy with the base station. In some embodiments, when the UE channel occupancy is to be shared by the base station or by the second UE, a first duration, in which the UE channel occupancy is shared, is determined.

In some embodiments, the FFP or the periodic channel occupancy includes a maximum channel occupancy and an idle period. In some embodiments, the first duration is determined by the maximum channel occupancy. In some embodiments, the UE periodic channel occupancy is semi-statically configured by the base station via a signaling. In some embodiments, the signaling includes radio resource control (RRC) signaling. In some embodiments, the UE maximum channel occupancy is pre-defined or pre-configured. In some embodiments, the UE maximum channel occupancy is proportional to the first period. In some embodiments, the UE maximum channel occupancy includes X % of the first period, where X is pre-defined or pre-configured, the rest of the FFP includes the idle period. In some embodiments, the UE is not allowed to transmit signals in the idle period. In some embodiments, when the UE channel occupancy is to be shared by the base station, the base station should not perform transmission in the idle period. In some embodiments, the first duration is indicated by the CG-UCI. In some embodiments, the first duration ends at the earliest between the end of the UE maximum channel occupancy and a duration indicated by the CG-UCI. In some embodiments, if the UE maximum channel occupancy ends earlier than the duration indicated by the CG-UCI, the first duration ends at the end of the UE maximum channel occupancy.

In some embodiments, if the UE maximum channel occupancy ends later than the duration indicated by the CG-UCI, the first duration ends at the duration indicated by the CG-UCI. In some embodiments, a starting location for the lust duration is pre-defined or pre-configured. In some embodiments, the starting location for the first duration is relevant to the last CG resource in the periodic channel occupancy. In some embodiments, the starting location for the first duration is from an earliest slot boundary after the last CO resource in the periodic channel occupancy. In some embodiments, a starting location for the first duration is indicated by the CG-UCI. In some embodiments, the first duration is equal to the starting location for the COT sharing duration plus a pre-defined or pre-configured length. In some embodiments, the CG-UCI does not include information about channel access priority class (CAPC). In some embodiments, a CAPC value is pre-defined or pre-configured. In some embodiments, a pre-defined or pre-configured CAPC value is assumed by the base station. In some embodiments, the method further includes using the pre-defined or pre-configured CAPC value to perform channel access procedure. In some embodiments, the pre-defined or pre-configured CAPC value corresponds to the lowest priority value. In some embodiments, the starting location of the first duration includes a starting location of a periodic channel occupancy of the base station or an FFP of the base station.

Figure 3:
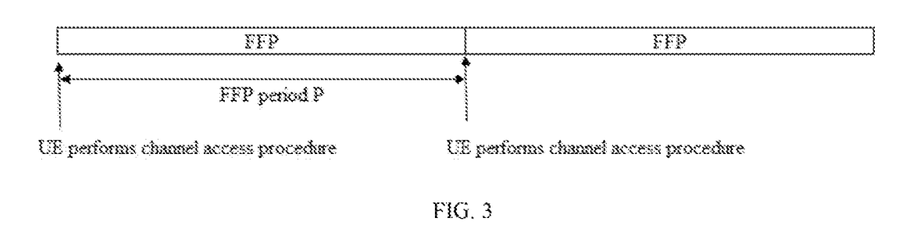
FIG. 3 is a schematic diagram illustrating an example of a fixed frame period (FFP) configuration according to an embodiment of the present disclosure.

FIG. 3 illustrates that, in some embodiments, a UE can be configured by a gNB with one or more fixed frame period (FFP). Each of the FFP has a period P. At the beginning of each FFP, the UE can perform channel access procedure in order to access the channel as illustrated in FIG. 3.

Figure 4:
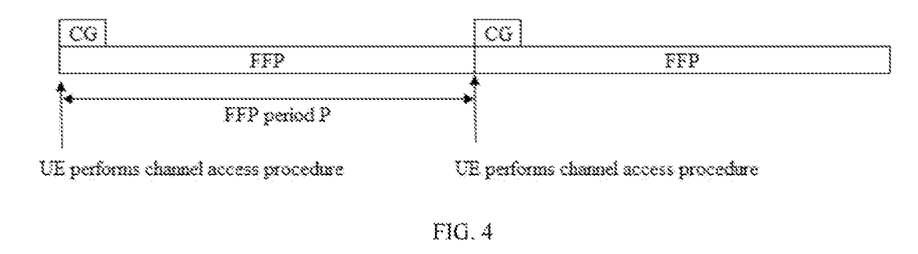
FIG. 4 is a schematic diagram illustrating an example of a fix frame period (FFP) configuration according to an embodiment of the present disclosure.

FIG. 4 illustrates that, in some embodiments, the UE is also configured with configured grant (CG) resources, in which the UE can transmit CG-PUSCH. In an implementation, the CG-PUSCH resources are relevant to the FFP, e.g. the CG-PUSCH period is relevant to the FFP. In an implementation, for each FFP, it starts with CG-PUSCH resource as illustrated in FIG. 4.

Figure 5:
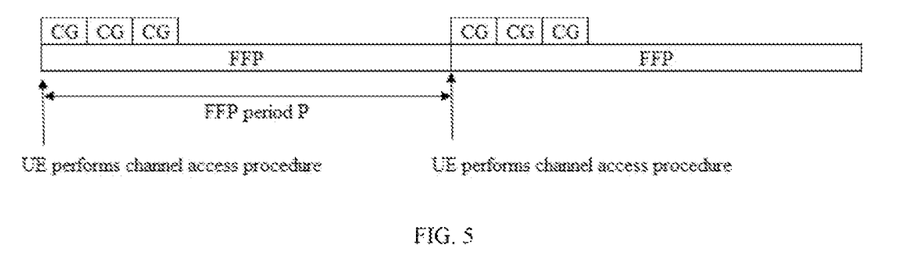
FIG. 5 is a schematic diagram illustrating an example of a fixed frame period (FFP) configuration according to an embodiment of the present disclosure.

FIG. 5 illustrates that, in some embodiments, there are more than one CG-PUSCH resources in FFP, as illustrated in FIG. 5, and when UE successfully access the channel at the beginning of the FFP, the UE may continue transmitting CG-PUSCH in the rest of the CP-PUSCH resources in the FFP.

In some examples, when UE transmits CG-PUSCH, it transmits also a CG-UCI, where the CG-UCI contains a first indication information indicates COT sharing information to the gNB. In an implementation, the indication information includes 1 bit, which indicates the COT of the UE can be shared or not, e.g. if the bit is it means the car can be shared, otherwise the COT is not to be shared.

In some example, the OF is configured by the gNB with a COT sharing energy detection threshold, then the UE should use this configured COT sharing energy detection threshold to perform channel access procedure. In this case, the UE COT is always sharable by the gNB. The advantage is that the bit of the CG-UCI can be removed to make the transmission efficiency better.

In an implementation, the UE can select if the configured COT sharing energy detection threshold is used for performing channel access procedure. In this case, the CG-UCI should contain the first indication information to indicate if the UE COT can be shared by the gNB, in an implementation, when the UE selects to use configured CUT sharing energy detection threshold, the UE can also select, to share its COT or not. But, when the UE does not use the configured COT sharing energy detection threshold for performing channel access procedure, the UE cannot share its COT with the gNB.

Figure 6:
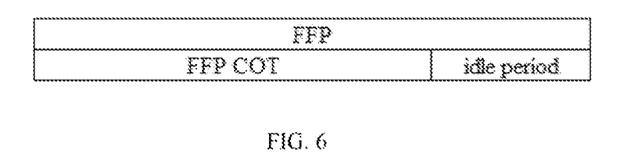
FIG. 6 is a schematic diagram illustrating an example of a fixed frame period (FFP) configuration according to an embodiment of the present disclosure.
Figure 7:
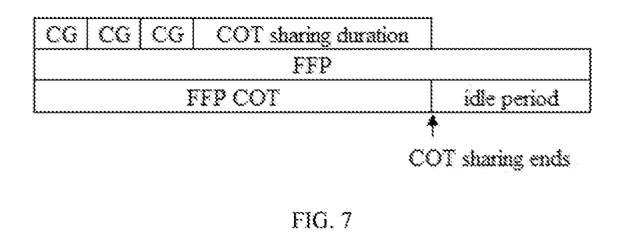
FIG. 7 is a schematic diagram illustrating an example of a fixed frame period (FFP) configuration according to an embodiment of the present disclosure.

FIG. 6 and FIG. 7 illustrate that, in some embodiments, when the gNB shares the UE COT in an FFP, the duration of the COT sharing needs to be determined. One option is that the COT sharing duration is determined by FFP COT end (as illustrated in FIG. 6 and FIG. 7), where the FFP COT end is semi-statically configured by the gNB via e.g. RRC signaling. In an implementation, the FFP COT end is pre-defined which can be proportional to FFP, e.g. X % of the FFP, where X is pre-defined or pre-configured (for instance 95%), the rest of the part is called idle period and the UE is not allowed to transmit signals in the idle period. Similarly, when the UE COT is shared by the gNB, the gNB should not transmit signals in the idle period.

Figure 8:
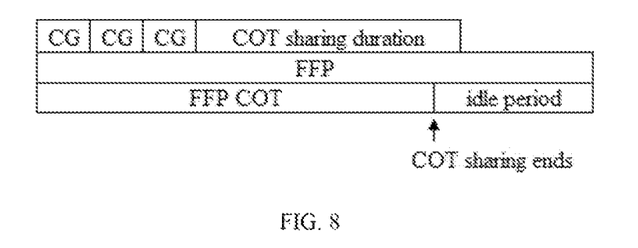
FIG. 8 is a schematic diagram illustrating an example of a fixed frame period (FFP) configuration according to an embodiment of the present disclosure.
Figure 9:
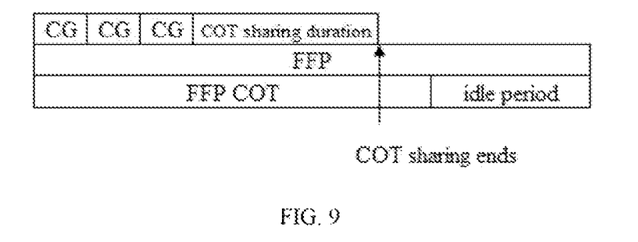
FIG. 9 is a schematic diagram illustrating an example of a fixed frame period (FFP) configuration according to an embodiment of the present disclosure.

FIG. 8 and FIG. 9 illustrate that, in some embodiments, another option is that the COT sharing duration is indicated by the CG-UCI. In an implementation, the COT sharing duration ends at the earliest between FFP COT end and the duration indicated by CG-UCI, i.e. if the FFP COT ends earlier than the indicated COT sharing duration end, the COT sharing duration should end at FFT COT end (as illustrated in FIG. 8), otherwise, the COT sharing duration ends at the indicated COT sharing duration end as illustrated in FIG. 9).

In some examples, the starting location for the COT sharing duration is pre-configured, e.g. from an earliest slot boundary after the last CG resource. In an implementation, the starting location is indicated by the CG-UCI. In some examples, the CG-UCI does not include information about CAPC, and the CAPC value is pre-defined or the gNB assumes a pre-defined CAPC value. The advantage is that the number of CG-UCI bits can be saved and transmission efficiency and accuracy can be improved. The UE uses the pre-defined CAPC value for channel access. The BS knows that the UE uses the pre-defined CAPC value for channel access. The pre-defined CAPC value corresponds to the lowest priority value.

Figure 10:
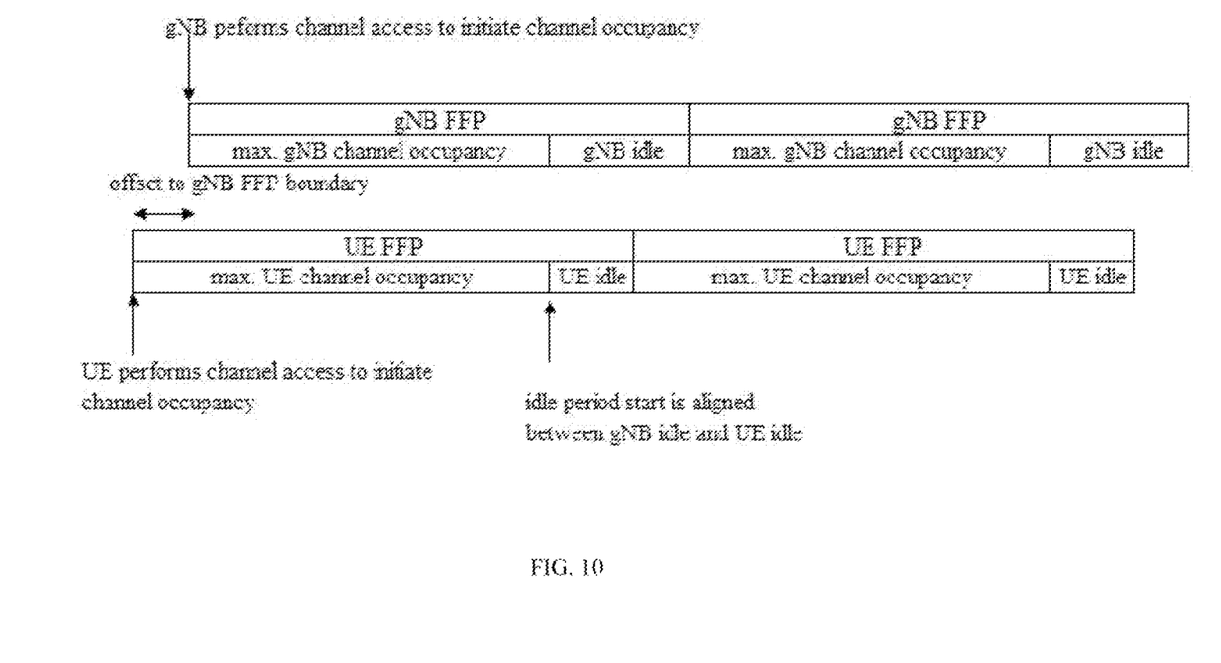
FIG. 10 is a schematic diagram illustrating an example of a UE FFP configuration and a gNB FFP configuration according to an embodiment of the present disclosure.
Figure 11:
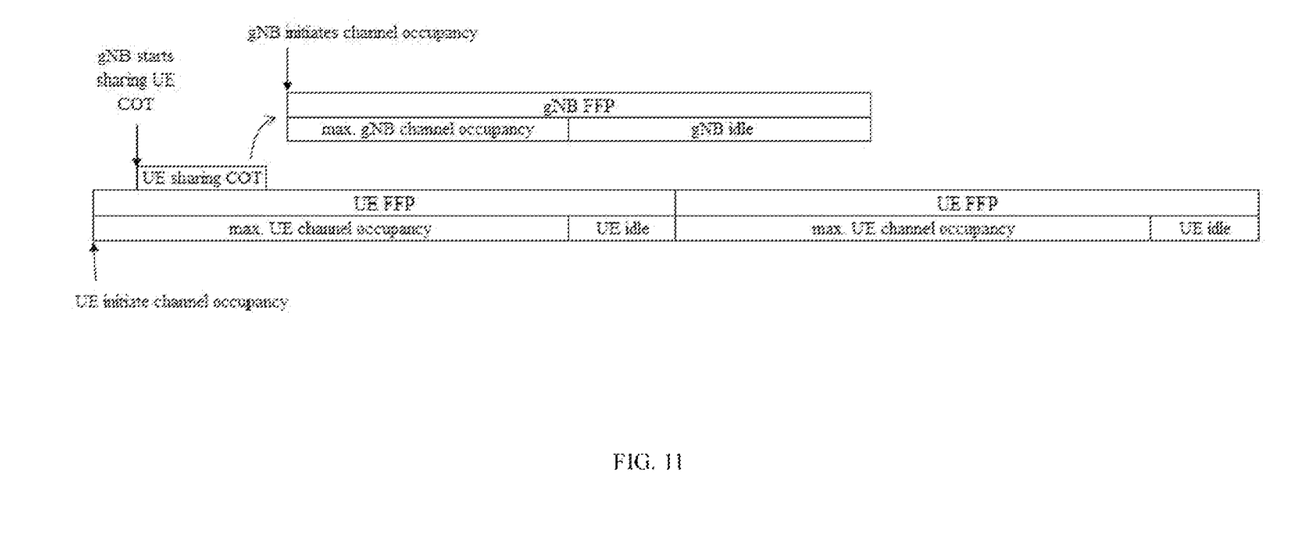
FIG. 11 is a schematic diagram illustrating an example of a UE FFP configuration and a gNB FFP configuration according, to an embodiment of the present disclosure.

FIG. 10 and FIG. 11 illustrate that, in some embodiments, UE FFP is configured to have a same period as gNB FFP with an offset in time domain. The maximum gNB channel occupancy is different from the maximum UE channel occupancy. But the starting location of the gNB idle period is aligned with the starting location of the UE idle period. UE can perform channel access procedure to initiate channel occupancy at the beginning, of the UE FFP. In an implementation, when UE initiates a channel occupancy, the UE can share the UE channel occupancy with the gNB. Then, the gNB can perform a channel access procedure in the UE channel occupancy, while approaching the next gNB FFP start, the gNB can re-perform a channel access procedure to initiate gNB channel occupancy as illustrated in FIGS. 10 and 11. The advantage is that the gNB can have flexibility to use UE shared channel occupancy or its own channel occupancy, With this method, the gNB can have more chance to access the channel. In an implementation, the UE is configured to always share the UP channel occupancy with the gNB.

Commercial interests for some embodiments are as follows. 1. Allowing UE initiated channel occupancy and UP can share the initiated channel occupancy with the base station in a semi-static channel access mode. 2. Solving issues in the prior. 3. Improve transmission latency. 4. Providing a good communication performance. 5. Providing high reliability. 6. Some embodiments of the present disclosure are used by 5G-NR, chipset vendors, V2X communication system development vendors, automakers including cars, trains, trucks, buses, bicycles, mow-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 12:
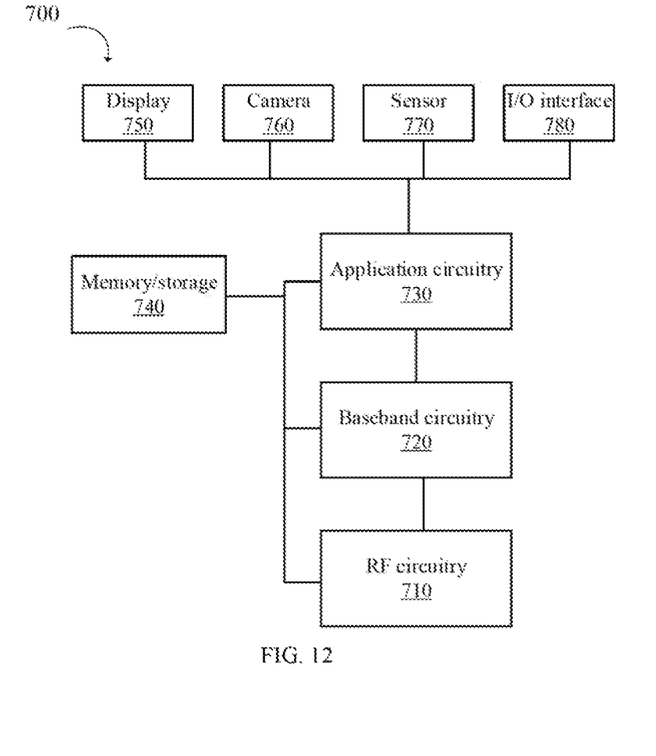
FIG. 12 is a block diagram of a system for wireless communication according to an embodiment of the present disclosure.

FIG. 12 is a block diagram of an example system 700 for wireless communication according to an embodiment of the present disclosure. Embodiments described herein may be implemented into the system using any suitably configured hardware and/or software. FIG. 12 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shilling, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN), Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RE circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and: or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (PRAM)), and/or non-volatile memory, such as flash memory.

In various embodiments, the interface 780 may include one or more user interfaces designed to enable user interaction with the system and/or peripheral component interfaces designed to enable peripheral component interaction with the system. User interfaces may include, bat are not limited to a physical keyboard or keypad, a touchpad, a speaker, a microphone, etc. Peripheral component interfaces ma include, but are not limited to, a non-volatile memory port, a universal serial bus (USB) port, an audio jack, and a power supply interface. In various embodiments, the sensor 770 may include one or more sensing devices to determine environmental states and/or location first information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units far display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of communication of a user equipment (UE), comprising:
    initiating a periodic channel occupancy with a first period; and
    using a first information to indicate the initiated channel occupancy that is to be shared by a base station or a second UE;
    wherein when the UE channel occupancy is to be shared by the base station or by the second UE, a first duration, in which the UE channel occupancy is shared, is determined;
    wherein an fixed frame period (FFP) or the periodic channel occupancy comprises a maximum channel occupancy and an idle period;
    wherein the first duration is determined by the maximum channel occupancy;
    wherein the first duration is indicated by a configured grant-uplink control information (CG-UCI);
    wherein the first duration ends at the earliest between the end of the UE maximum channel occupancy and a duration indicated by the CG-UCI;
    wherein a starting location for the first duration is pre-defined or pre-configured;
    wherein the starting location for the first duration is from an earliest slot boundary after the last CG resource in the periodic channel occupancy.

2. The method of claim 1, wherein the initiating the periodic channel occupancy by the UE comprises performing a channel access procedure at the first period; or performing a channel access procedure at the beginning of each FFP.

3. The method of claim 1, further comprising the UE being configured with one or more periodic CG resources by the base station with a second period; wherein the second period is relevant to the first period.

4. The method of claim 3, wherein a first CC resource of the one or more periodic CG resources is located at the beginning of the periodic: channel occupancy or is located at the beginning of the FFP.

5. The method of claim 4, wherein the UE performs a channel access procedure before transmitting a CG-physical uplink shared channel (PUSCH) in the first CG resource.

6. The method of claim 5, wherein the UE transmits the CG-PUSCH after the channel access procedure and the channel is sensed to be idle.

7. The method of claim 1, further comprising being configured by the base station with channel occupancy time (COT) sharing information.

8. The method of claim 7, wherein the COT sharing information comprises a COT sharing energy detection threshold.

9. The method of claim 8, further comprising:
using the COT sharing energy detection threshold to perform the channel access procedure, or
selecting if the COT sharing energy detection threshold is used for performing the channel access procedure.

10. A user equipment (UE), comprising:
a memory;
a transceiver; and
a processor coupled to the memory and the transceiver;
wherein the processor is configured to:
initiate a periodic channel occupancy with a first period; and
use a first information to indicate the initiated channel occupancy that is to be shared by a base station or a second UE;
wherein when the UE channel occupancy is to be shared by the base station or by the second UE, a first duration, in which the UE channel occupancy is shared, is determined;
wherein an fixed frame period (FFP) or the periodic channel occupancy comprises a maximum channel occupancy and an idle period;
wherein the first duration is determined by the maximum channel occupancy;
wherein the first duration is indicated by a configured grant-uplink control information (CG-UCI);
wherein the first duration ends at the earliest between the end of the UE maximum channel occupancy and a duration indicated by the CG-UCI;
wherein a starting location for the first duration is pre-defined or pre-configured;
wherein the starting location for the first duration is from an earliest slot boundary after the last CG resource in the periodic channel occupancy;
wherein a starting location for the first duration is pre-defined or pre-configured;
wherein the starting location for the first duration is from an earliest slot boundary after the last CG resource in the periodic channel occupancy.

11. The UE of claim 10, wherein the first period of the periodic channel occupancy is configured by the base station.

12. The UE of claim 10, wherein the periodic channel occupancy comprises one or more FFPs.

13. The UE of claim 10, wherein initiating the periodic channel occupancy by the processor comprises performing a channel access procedure at the first period; or performing a channel access procedure at the beginning of each FFP.

14. The UE of claim 10, wherein the UE is configured with one or more periodic CG resources by the base station with a second period; wherein the second period is relevant to the first period.

15. The UE of claim 14, wherein a first CG resource of the one or more periodic CG resources is located at the beginning of the periodic channel occupancy or is located at the beginning of the FFP.

16. The UE of claim 15, wherein the processor performs a channel access procedure before transmitting a CG-physical uplink shared channel (PUSCH) in the first CG resource.

17. The UE of claim 11, wherein when the transceiver transmits a CG-PUSCH, the transceiver further transmits a CG UCI, wherein the CG-UCI comprises a first indication information indicating channel occupancy time (COT) sharing information to the base station or to the second UE.

18. The UE of claim 10, wherein the UE configured by the base station with COT sharing information.

19. A non-transitory machine-readable storage medium having stored thereon instructions that, when executed by a computer, cause the computer to:
initiate a periodic channel occupancy with a first period; and
use a first information to indicate the initiated channel occupancy that is to be shared by a base station or a second user equipment (UE);
wherein when the UE channel occupancy is to be shared by the base station or by the second UE, a first duration, in which the UE channel occupancy is shared, is determined;
wherein an fixed frame period (FFP) or the periodic channel occupancy comprises a maximum channel occupancy and an idle period;
wherein the first duration is determined by the maximum channel occupancy;
wherein the first duration is indicated by a configured grant-uplink control information (CG-UCI);
wherein the first duration ends at the earliest between the end of the UE maximum channel occupancy and a duration indicated by the CG-UCI;
wherein a starting location for the first duration is pre-defined or pre-configured;
wherein the starting location for the first duration is from an earliest slot boundary after the last CG resource in the periodic channel occupancy.

20. A chip, comprising:
a processor, configured to call and run a computer program stored in a memory, to cause a device in which the chip is installed to execute the method of claim 1.

* * * * *